(12) United States Patent
Kudo et al.

(10) Patent No.: US 11,941,849 B2
(45) Date of Patent: Mar. 26, 2024

(54) INFORMATION PROCESSING DEVICE

(71) Applicant: NEC Corporation, Tokyo (JP)

(72) Inventors: Yuta Kudo, Tokyo (JP); Rui Ishiyama, Tokyo (JP); Toru Takahashi, Tokyo (JP); Kengo Makino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 302 days.

(21) Appl. No.: 17/430,533

(22) PCT Filed: Feb. 15, 2019

(86) PCT No.: PCT/JP2019/005640
§ 371 (c)(1),
(2) Date: Aug. 12, 2021

(87) PCT Pub. No.: WO2020/166075
PCT Pub. Date: Aug. 20, 2020

(65) Prior Publication Data
US 2022/0130072 A1    Apr. 28, 2022

(51) Int. Cl.
*G06T 7/80* (2017.01)
*G06T 7/00* (2017.01)
*H04N 23/56* (2023.01)
*H04N 23/71* (2023.01)
*H04N 23/74* (2023.01)

(52) U.S. Cl.
CPC .............. *G06T 7/80* (2017.01); *G06T 7/0002* (2013.01); *H04N 23/56* (2023.01); *H04N 23/71* (2023.01); *H04N 23/74* (2023.01)

(58) Field of Classification Search
CPC ......... G06T 7/08; G06T 7/0002; H04N 23/74; H04N 23/05; H04N 23/71
USPC ............................................. 348/135
See application file for complete search history.

(56) References Cited

U.S. PATENT DOCUMENTS

| 8,948,491 B2* | 2/2015 | Sekiguchi | G01N 21/95 356/600 |
| 11,423,632 B2* | 8/2022 | Kudo | G01B 11/303 |
| 2009/0015823 A1* | 1/2009 | Yoshikawa | G01N 21/4738 356/237.2 |

(Continued)

FOREIGN PATENT DOCUMENTS

| JP | 2000-180142 A | 6/2000 |
| JP | 2008-202949 A | 9/2008 |

(Continued)

OTHER PUBLICATIONS

International Search Report for PCT Application No. PCT/JP2019/005640, dated May 14, 2019.

(Continued)

*Primary Examiner* — Frantz B Jean

(57) ABSTRACT

An information processing device, to be used in an image capturing device that illuminates an object by an illumination means and captures reflected light from the object as a reflection image by a capturing means, includes a determination means for determining an irradiation angle range for irradiating the object by the illumination means, on the basis of two types of inclination statistic values that are values corresponding to the inclination distribution of the unevenness existing on a surface of the object.

6 Claims, 12 Drawing Sheets

(56) References Cited

U.S. PATENT DOCUMENTS

| | | | |
|---|---|---|---|
| 2010/0098304 A1* | 4/2010 | Kiyomizu | G06V 40/67 382/124 |
| 2015/0192838 A1 | 7/2015 | Ishiyama | |
| 2016/0055398 A1 | 2/2016 | Ishiyama et al. | |
| 2018/0299386 A1 | 10/2018 | Masumura | |

FOREIGN PATENT DOCUMENTS

| | | | | |
|---|---|---|---|---|
| JP | 2008202949 | * | 9/2008 | ............ G01N 21/88 |
| JP | 2013-242624 A | | 12/2013 | |
| JP | 5866586 B | | 2/2016 | |
| WO | 2014/021449 A1 | | 2/2014 | |
| WO | 2014/163014 A1 | | 10/2014 | |
| WO | 2017/080975 A1 | | 5/2017 | |

OTHER PUBLICATIONS

Form PCT/IB345 and Third Party Observation dated Jun. 14, 2021.
Extended European Search Report for EP Application No. EP19914778.6 dated on Jan. 28, 2022.

* cited by examiner $\theta 1 < 2\alpha 1$ $\theta 1 = 2\alpha 1$ $\theta 1 > 2\alpha 1$

INFORMATION PROCESSING DEVICE

This application is a National Stage Entry of PCT/JP2019/005640 filed on Feb. 15, 2019, the contents of all of which are incorporated herein by reference, in their entirety.

TECHNICAL FIELD

The present invention relates to an information processing device, an information processing method, a storage medium, and an information processing system that enable reduction of diffuse reflection by adjusting an irradiation angle range.

BACKGROUND ART

Art called object fingerprint authentication has been known. In the object fingerprint authentication, fine unevenness naturally generated at a fine level that is equal to or lower than surface roughness defined as a quality standard, or fine unevenness applied by processing or the like, in particular, a random pattern generated by fine unevenness that is naturally generated by each processing and is different in each individual, is acquired as an image using a capturing device such as a camera, and the captured image is recognized, whereby each product is identified and managed.

As one of such art, Patent Literature 1 has been known. Patent Literature 1 discloses an information acquisition and identification system in which a satin pattern extracted from a captured image of the satin pattern formed on a component or a product and a previously stored image feature are collated with each other, whereby the component or the product is identified. Patent Literature 1 also discloses using an imaging aid having a light source unit for capturing a satin pattern. According to Patent Literature 1, it is desirable to perform capturing under a constant illumination condition at all time.

Further, as related art, Patent Literature 2 has been known. Patent Literature 2 discloses an illumination device for inspection to detect minute defects. According to Patent Literature 2, in the illumination device for inspection, it is possible to change the shape and the size of an irradiation solid angle and an inclination angle of inspection light according to feature points of an inspected object, that is, changes caused at a defect portion.
Patent Literature 1: WO 2014/163014 A
Patent Literature 2: JP 5866586 B

SUMMARY

In order to realize individual identification and collation of an object with high accuracy by using a random pattern in which fine unevenness on a surface of an object is imaged, it is desirable to capture the surface unevenness with high contrast. However, there is a problem that it is difficult to capture a high-contrast image.

In view of the above, an object of the present invention is to provide an information processing device, an information processing method, a storage medium, and an information processing system that enable capturing of a high-contrast image.

In order to achieve such an object, an information processing device according to one aspect of the present invention is an information processing device to be used in an image capturing device that illuminates an object by an illumination means and captures reflected light from the object as a reflection image by a capturing means. The information processing device includes
a determination means for determining an irradiation angle range for irradiating the object by the illumination means, on the basis of two types of inclination statistic values that are values corresponding to inclination distribution of unevenness existing on a surface of the object.

Further, an information processing method according to another aspect of the present invention includes
determining an irradiation angle range for irradiating an object by an illumination means, on the basis of two types of inclination statistic values that are values corresponding to inclination distribution of unevenness existing on a surface of the object;
controlling the illumination means to illuminate the object within the irradiation angle range determined; and
capturing reflected light from the object.

Further, a storage medium according to another aspect of the present invention is a computer-readable storage medium storing a program for causing an information processing device, to be used in an image capturing device that illuminates an object by an illumination means and capturing reflected light from the object as a reflection image by a capturing means, to realize
a determination means for determining an irradiation angle range for irradiating the object by the illumination means, on the basis of two types of inclination statistic values that are values corresponding to inclination distribution of unevenness existing on a surface of the object.

Further, an information processing system according to another aspect of the present invention includes
an illumination means for illuminating an object;
a capturing means for capturing reflected light from the object as a reflection image; and
an information processing device including a determination means for determining an irradiation angle range for irradiating the object by the illumination means, on the basis of two types of inclination statistic values that are values corresponding to inclination distribution of unevenness existing on a surface of the object.

With the configurations as described above, the present invention is able to provide an information processing device, an information processing method, a storage medium, and an information processing system that solve a problem that it is difficult to easily capture a high-contrast image.

EXEMPLARY EMBODIMENTS

First Exemplary Embodiment

Figure 1:
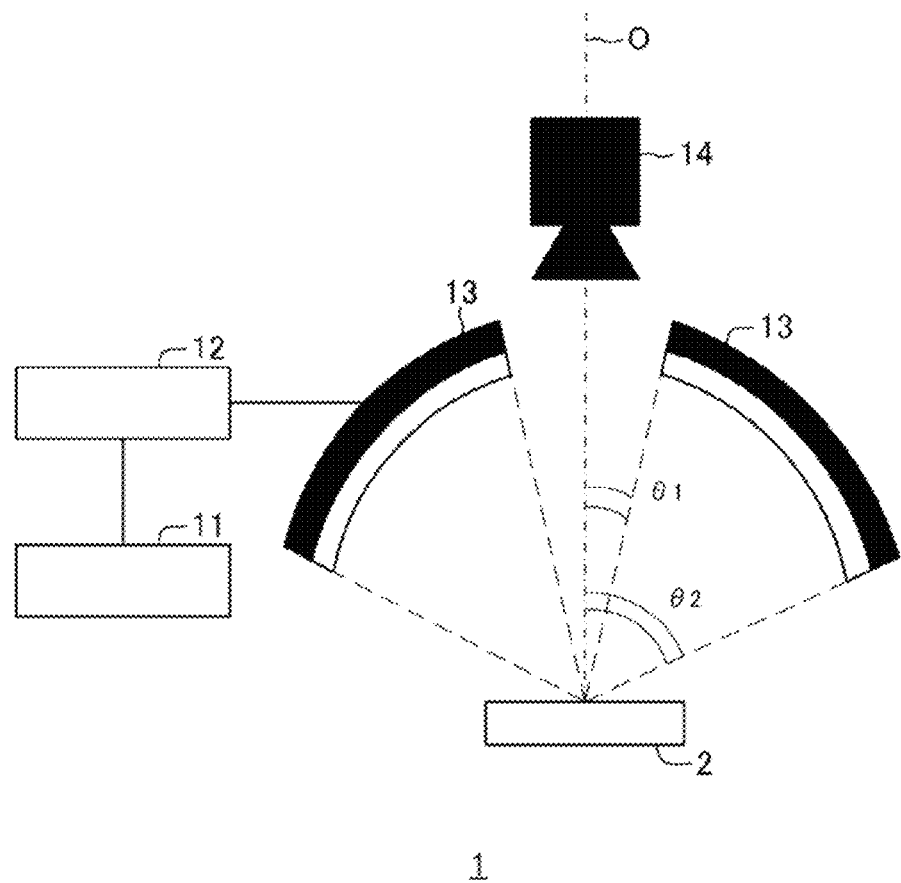
FIG. 1 illustrates an example of an overall configuration of an image capturing system according to a first exemplary embodiment of the present invention.

Hereinafter, an image capturing system 1 (information processing system) used for identifying an individual object will be described as an exemplary embodiment of the present invention. The image capturing system 1 of the present invention captures an image of an object 2 to be identified in order to identify an individual. As described below, the image capturing system of the present embodiment includes a measurement means 11 for measuring unevenness existing on a surface of the object 2, and a control means 12 for determining the irradiation angle range when an illumination means 13 illuminates the object 2 on the basis of a measurement result by the measurement means 11. Note that the image capturing system 1 may be used for a purpose other than individual identification.

The object 2 is an industrial product, a product, a container, a packing article, a machine component, a part thereof, or goods or a component for manufacturing an industrial product or a product.

The material of the object 2 may be glass, ceramics, resin, fabric, leather, metal, other materials, or a processed or coated material. While the image capturing system 1 of the present embodiment is applicable to any of those materials, it is particularly preferable for a material having low specular reflection or a material having been processed or coated to reduce specular reflection. In a material having low specular reflection, the intensity of specular reflected light made incident on a capturing means 14 according to the inclination angle of each uneven part on the surface of the material is low. Therefore, it is difficult to capture a high-contrast image. By controlling the irradiation angle range by the method of the present invention to reduce the intensity of the diffuse reflection light that is a cause of lowering the contrast and to relatively increase the intensity of the specular reflection light, it is possible to capture a high-contrast image.

The unevenness on a surface of the object 2 includes flaws, fine unevenness, and patterns that are naturally formed in the process of manufacturing and processing the object 2. In particular, on a product made of cast metal or resin or a pottery product, fine unevenness is formed on the surface thereof in the process of manufacturing. The unevenness pattern differs individually.

FIG. 1 illustrates an example of an overall configuration of the image capturing system 1 (image capturing device). In the example of FIG. 1, the image capturing system 1 includes the measurement means 11, the control means 12, the illumination means 13, and the capturing means 14.

The measurement means 11 measures fine unevenness existing on a surface of the object 2 and acquires measurement data of the unevenness on the surface of the object 2. As the measurement means 11, a measurement device such as a confocal laser microscope (for example, VK-260 made by KEYENCE CORPORATION) or the like can be used. As the measurement means 11, any other general devices used for measuring unevenness may also be used.

The measurement means 11 is communicably connected with the control means 12. The measurement means 11 transmits unevenness measurement data, that is a measurement result, to the control means 12.

The control means 12 is an information processing device that determines an irradiation angle range that is an illumination condition for illuminating the object 2 by the illumination means 13, on the basis of a measurement result by the measurement means 11. The control means 12 receives unevenness measurement data that is a measurement result of surface unevenness of the object 2, from the measurement means 11. Then, the control means 12 determines the irradiation angle range for illuminating the object 2 by the illumination means 13, on the basis of the received unevenness measurement data. In other words, the control means 12 determines from which angle range the object 2 is irradiated by the illumination means 13.

The illumination means 13 irradiates the object 2 with light under the illumination condition (irradiation angle range) determined by the control means 12. The illumination means 13 can be communicably connected with the control means 12 and the capturing means 14.

The illumination means 13 can be configured such that the irradiation angle range is controllable manually or by the control of the control means 12. In the present embodiment, a specific configuration for controlling the irradiation angle range is not particularly limited. For example, the illumination means 13 may include a housing with an opening at the lower end and a plurality of light sources provided to the housing. The light sources may be arranged in a ring shape. The illumination means 13 may control the light sources (lighting, extinction, adjustment of color and light amount, and the like) according to the irradiation angle range determined by the control means 12. Alternatively, the illumination means 13 may be configured to use a plurality of illumination means having different irradiation angle ranges separately, according to the irradiation angle range determined by the control means 12. The illumination means 13 may have a well-known configuration for controlling the irradiation angle range. The housing covers the object 2, and can be used as a shielding part for shielding light other than the light radiated from the illumination means 13. The housing may have a structure to which the capturing means 14, described below, is attachable.

The light source of the illumination means 13 is a light-emitting diode (LED), a light bulb, an organic light-emitting diode, an incandescent light bulb, a fluorescent lamp, or the like. It can be selected appropriately in consideration of the amount of light of the irradiation light, easiness in control of illumination condition, and the like.

It is desirable that the light radiated from the illumination means 13 is light having a wavelength band in which the reflectance of the object 2 is low. That is, it is desirable that the light source of the illumination means 13 has radiation intensity of relatively high spectral distribution in a wavelength band in which the spectral reflectance is relatively low in the spectral reflectance characteristics of the object 2. For example, in the case where the surface of the object 2 is blue, it is preferable that the illumination means 13 radiates red light. Thereby, it is possible to suppress an influence of light components diffused and reflected by the object 2. As a result, light components that are mirror-reflected at the surface of the object 2 can be emphasized.

The capturing means 14 captures an image of the object 2 in a state where the illumination means 13 irradiates the object 2 with light. To the capturing means 14, reflected light from the object 2 enters. Image data captured by the capturing means 14 may be a color image or a black and white image.

The capturing means 14 is configured of a camera using a charge-coupled device (CCD) image sensor or a complementary metal oxide (CMOS) image sensor, and the like. The capturing means 14 is a device having a camera function such as a digital camera, a smartphone, a tablet terminal, a mobile phone, or the like, for example. The capturing means 14 may include a device having a camera function and an imaging aid. An imaging aid is a device such as a lens (wide angle lens, magnifying lens, telephoto lens, or the like) or another device for changing magnification, image angle, and resolution.

The capturing means 14 can be communicably connected with the control means 12 and the illumination means 13. The capturing means 14 can also be connected with an external information processing device having a screen display unit such as an LCD and an image processing unit, not shown. The capturing means 14 may have a function of transmitting captured image data to a screen display unit or an external information processing device.

Note that the image capturing system 1 may include a black shielding part that covers the periphery of the object 2 so as to prevent light other than the irradiation light from the illumination means 13 from entering the object 2. Alternatively, the irradiance of the irradiation light from the illumination means 13 may be set to be sufficiently higher than the irradiance of light other than the irradiation light. By setting it to be higher irradiance, it is possible to disregard the influence of light other than the irradiation light.

The illumination means 13 and the capturing means 14 are arranged to have a common optical axis O immediately above the object 2 in the vertical direction. However, the configuration of the image capturing system 1 to which the method of the present invention is applied is not limited to the case illustrated in the present embodiment. The illumination means 13 and the capturing means 14 may be arranged in a positional relation other than that illustrated in FIG. 1.

Figure 2:
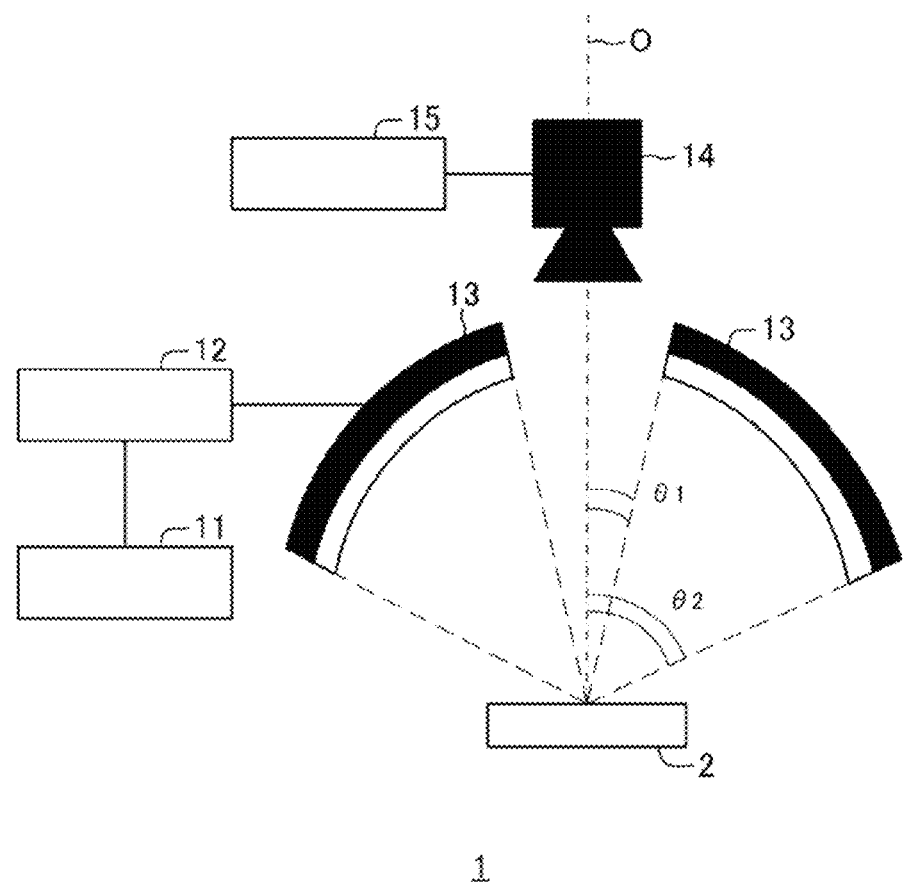
FIG. 2 illustrates another exemplary configuration of an image capturing system.

FIG. 2 illustrates a modification of the image capturing system 1. The image capturing system 1 of the modification of FIG. 2 includes the measurement means 11, the control means 12, the illumination means 13, the capturing means 14, and a collation means 15. The functions of the measurement means 11, the control means 12, and the illumination means 13 are the same as those of the example of FIG. 1 described above.

The capturing means 14 in the modification transmits captured image data to the collation means 15.

The collation means 15 uses the image data acquired from the capturing means 14 to perform identification, collection, and authenticity determination of an object. For example, the collation means 15 performs an identification and collation process of an object using information extracted from the acquired image data and information previously stored in a storage means such as a database. For example, the collation means 15 compares the feature amount of an image obtained from the received image data with the previously stored feature amount. As a result of comparison, when the feature amounts of the two match, the collation means 15 may determine that the collation target object and the object corresponding to the stored feature amount are identical.

The feature amount to be used for collation may be a feature point that is a characteristic point existing at an edge or a corner extracted from the image data. Alternatively, the feature amount may be a local feature amount that is a feature amount related to a feature point extracted from the image data. The local feature amount can be extracted from the feature point extracted from the image data and a pixel value of a nearby pixel.

The collation means 15 transmits a collection result to an external output means or a display means. A result of collation may be information or a message representing whether or not collation has succeeded. Alternatively, a result of collation may be information, a message (product No., manufacturing No., brand name, serial No., name of manufacturer, name of distribution dealer) or the like that can uniquely specify the identified individual. The external output means is, for example, a mobile terminal (smartphone, tablet, personal computer, mobile telephone, other terminals having a communication function and a display function) of a user to be collated, or a server used for providing services, and a collation result may be transmitted to a mobile terminal or a server. A user can check a collation result by the website or an application for providing collation service.

As described in the modification above, the present invention is applicable to an object identifying device 10 having the image capturing system 1 (image capturing device) and the collation means 15 for performing a predetermined collation process based on the image captured by the image capturing system 1. Note that the collation process described above is an example. The collation means 15 may perform a collation process using a method other than that illustrated above as an example. Moreover, the function as the collation means 15 may be held by the control means 12, for example. That is, the object identifying device 10 may have one information processing device having a function as the control means 12 and a function as the collation means 15, instead of the control means 12 and the collation means 15.

The exemplary configuration of the image capturing system 1 is as described above. In the present embodiment, a specific configuration of the object 2 is not particularly limited.

Figure 3:
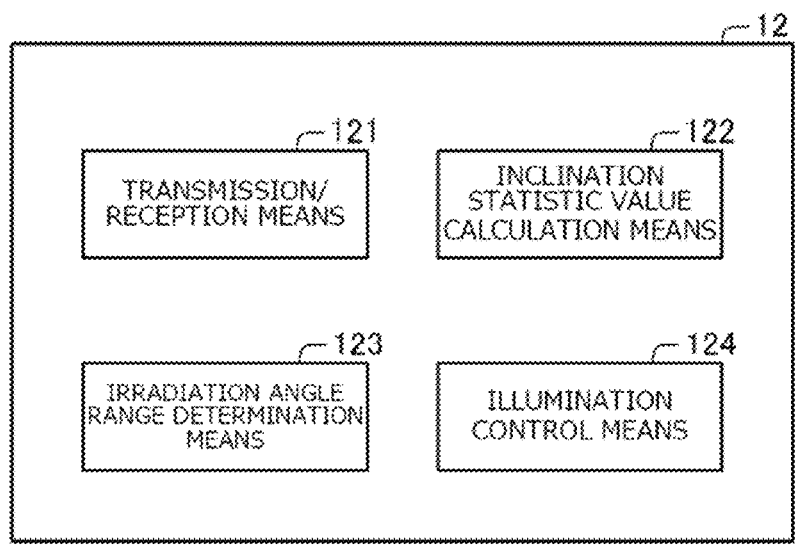
FIG. 3 is a block diagram illustrating an exemplary configuration of the control means illustrated in FIG. 1.

FIG. 3 illustrates exemplary function blocks of the control means 12 in the present embodiment. Referring to FIG. 3, the control means 12 includes a transmission/reception means 121, an inclination statistic value calculation means 122, an irradiation angle range determination means 123 (determination means), and an illumination control means 124. Note that the control means 12 may include, for example, a storage device and an arithmetic unit such as a central processing unit (CPU) not illustrated. The control means 12 implements the respective processing means described above by the execution of a program stored in the storage device by the arithmetic unit.

The transmission/reception means 121 transmits and receives information to and from the measurement means 11 and the illumination means 13. The transmission/reception means 121 receives unevenness measurement data that is a measurement result of unevenness on a surface of the object 2, from the measurement means 11.

The inclination statistic value calculation means 122 calculates an inclination statistic value that is a statistic value of inclination distribution of unevenness on a surface of the object 2, on the basis of unevenness measurement data acquired from the transmission/reception means 121. In other words, the inclination statistic value calculation means 122 analyzes the unevenness measurement data to thereby calculate two types of inclination statistic values that are values corresponding to the inclination distribution of fine unevenness existing on the surface of the object 2. As the two types of inclination statistic values, a first inclination statistic value $\alpha 1$ that substantially halves the inclination distribution into two parts and a second inclination statistic value $\alpha 2$ that represents a right bottom portion of the inclination distribution are calculated. For example, as the statistic values, $\alpha 1$ may be a mean value and $\alpha 2$ may be a 95% point. Note that the inclination statistic values are not limited to them. As the inclination statistic values, arbitrary statistic values may be used such as $\alpha 1$ being an average value and $\alpha 2$ being an average value+2σ (σ is a standard deviation).

The irradiation angle range determination means 123 determines the irradiation angle range when the illumination means 13 irradiates the object 2, on the basis of the inclination statistic values calculated by the inclination statistic value calculation means 122. For example, the irradiation angle range determination means 123 calculates values of plane half angles θ1 and θ2 (see FIG. 1) of the irradiation solid angle with the vertical direction of the object 2 being the center, on the basis of the inclination statistic values. The irradiation angle range determination means 123 determines the irradiation angle range (θ1, θ2) from the calculated plane half angles θ1 and θ2. Note that the plane half angles θ1 and θ2 of the irradiation solid angle show zenith angles from the optical axis O as illustrated in FIG. 1.

The irradiation angle range determination means 123 determines the irradiation angle range (θ1, θ2) on the basis of the expression provided below to thereby enable image capturing in which the light-dark pattern is clear and the diffuse reflection is reduced.

$$\theta 1 = 2 \times \alpha 1, \theta 2 = 2 \times \alpha 2$$

The irradiation angle range determination means 123 may calculate values that are almost twice as large as the inclination statistic values $\alpha 1$ and $\alpha 2$ that are calculation results by the inclination statistic value calculation means 122, as described above for example. The inclination statistic value calculation means 122 may determine the irradiation angle range (θ1, θ2) from θ1 and θ2 that are twice as large as the statistic values $\alpha 1$ and $\alpha 2$.

Here, the grounds for performing the above-described process will be described with reference to FIG. 4.

Figure 4:
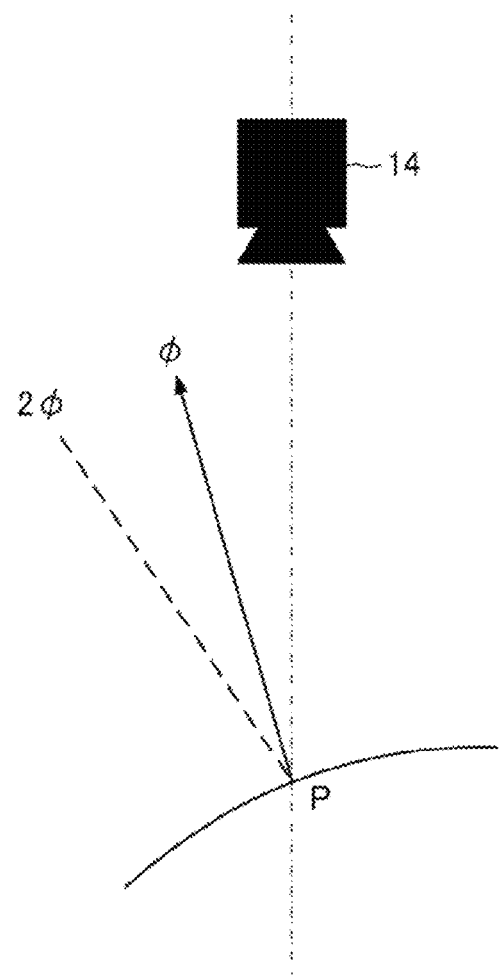
FIG. 4 illustrates an example of a relationship between the irradiation angle and light and dark.

FIG. 4 is a schematic diagram of a part of unevenness on a surface of the object 2. In FIG. 4, an angle φ is an inclination angle from the optical axis O of the normal line stood at a point P on the surface of an object. When the illumination means 13 exists in a linearly symmetrical direction (zenith angle θ=2φ) with the optical axis O with respect to the normal line, the direct light reflected at the point P enters the capturing means 14. On the other hand, when the illumination means 13 does not exist in the direction of zenith angle θ=2φ, there is no direct light that reflects at the point P and enters the capturing means 14. That is, when the illumination means 13 makes the direct light incident on the object 2 from a range where the zenith angle θ is between θ1 degrees and θ2 degrees, an image of the object 2 captured by the capturing means 14 has a light-dark pattern in which a portion of the object 2 having an inclination angle φ of $\alpha 1$ to $\alpha 2$ is light.

Next, grounds for using a value that substantially halves the inclination distribution as the first inclination statistic value $\alpha 1$ will be described with reference to FIG. 5a-c.

Figure 5A:
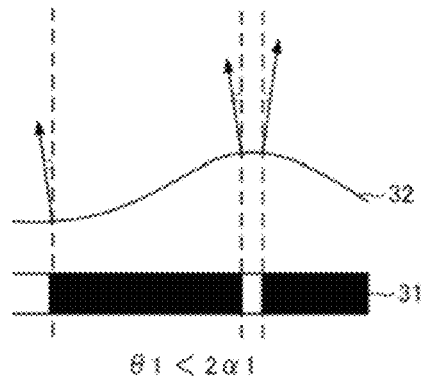
FIG. 5a illustrates examples of changes in the irradiation angle and a captured image.
Figure 5B:
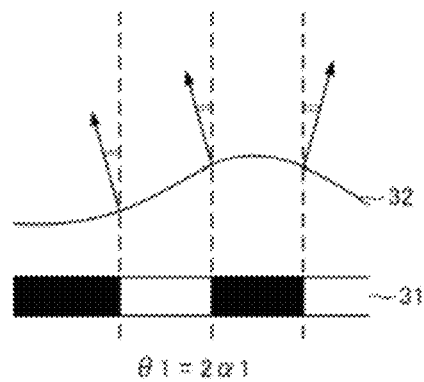
FIG. 5b illustrates examples of changes in the irradiation angle and a captured image.
Figure 5C:
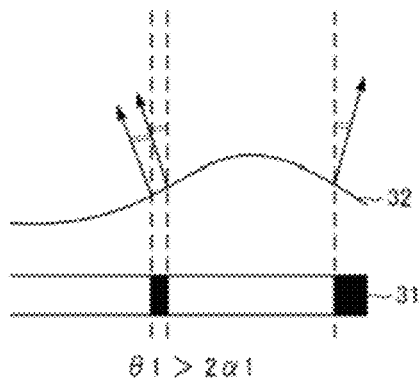
FIG. 5c illustrates examples of changes in the irradiation angle and a captured image.

FIG. 5a-c is a schematic diagram representing a change in a captured image with respect to a change in θ1 of the irradiation angle range (θ1, θ2). More specifically, FIG. 5a illustrates one line portion (one-dimensional image 31) of the captured image, and a cross-section 32 of the surface of the object, where θ1 of the irradiation angle range (θ1, θ2) satisfies θ1<2$\alpha 1$. FIG. 5(b) FIG. 5b illustrates one line portion (one-dimensional image 31) of the captured image, and the cross-section 32 of the surface of the object, where θ1 satisfies θ1=2$\alpha 1$. FIG. 5c illustrates one line portion (one-dimensional image 31) of the captured image, and the cross-section 32 of the surface of the object, where θ1 satisfies θ1>2$\alpha 1$.

As illustrated in FIG. 5b, when θ1=2$\alpha 1$, the areas of the region of φ<$\alpha$ and the region of φ>$\alpha$ are almost the same. Therefore, in the image, the areas of light and dark are almost the same. On the other hand, as illustrated in FIG. 5a, when θ1<2$\alpha 1$, the light area is smaller, and when it becomes significantly smaller than one pixel of the camera, the light receiving amount is reduced, whereby the contrast with the dark pixel is lowered. Further, as illustrated in FIG. 5c, when θ1>2$\alpha 1$, the dark area is smaller, and when it becomes significantly smaller than one pixel, it is difficult to be detected, whereby the contrast with the light pixel is lowered. Accordingly, image capturing can be made with the highest contrast when θ1=2$\alpha 1$. Note that when θ1 is extremely separated from 2$\alpha 1$, the one-dimensional image 31 is entirely dark or light, whereby light-dark pattern cannot be captured.

Next, grounds for using a value that represents a right bottom portion of the inclination distribution as the second inclination statistic value $\alpha 2$ will be described with reference to FIG. 6.

Figure 6:
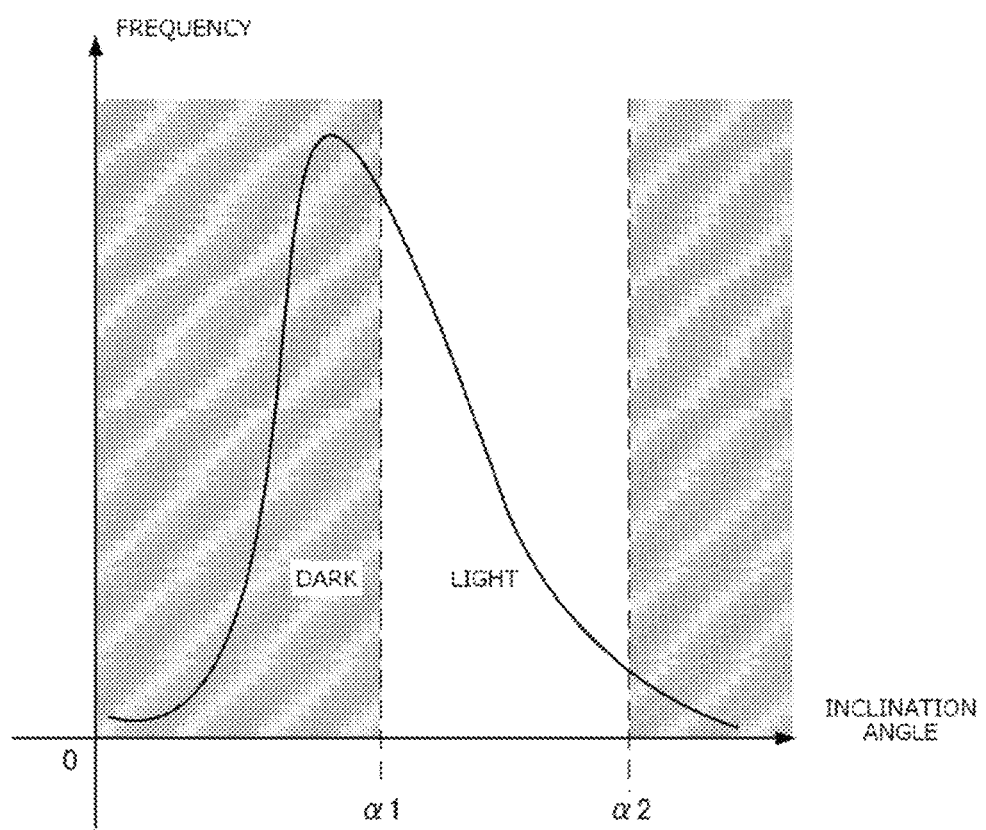
FIG. 6 illustrates an example of inclination distribution.

FIG. 6 illustrates an example of inclination distribution of unevenness on the surface of the object 2. Referring to FIG. 6, the first inclination statistic value $\alpha 1$ substantially halves the area of the inclination distribution illustrated in FIG. 5. FIG. 6. Here, since the illumination light having the zenith angle θ2=2$\alpha 2$ or larger is the right bottom portion of the inclined portion, it hardly affects the light-dark pattern. This is because contrast is not changed significantly by the light and dark of the right bottom portion having less frequency on FIG. 6, therefor an image pattern can be captured without any problems. That is, by setting the range of 90° from the zenith angle 82 to be dark, it is possible to reduce diffuse reflection in a state of clearly maintaining the light-dark pattern.

Due to the grounds as described above, the irradiation angle range determination means 123 calculates, for example, values that are almost twice as large as the inclination statistic values α1 and α2 that are calculation results by the inclination statistic value calculation means 122. The irradiation angle range determination means 123 determines the irradiation angle range (θ1, θ2) from the calculated inclination statistic values.

The illumination control means 124 controls the illumination means 13 and the like such that the irradiation angle range when the illumination means 13 irradiates the object 2 with light becomes (θ1, θ2).

The illumination control means 124 controls the lighting range of the illumination means 13 and the shielding range by the shielding means 131 such as a diaphragm formed in the illumination means 13, to thereby allow the irradiation angle range (θ1, θ2) to satisfy θ1=2α1 and θ2=2α2. In other words, the illumination control means 124 controls the lighting range of the illumination means 13 and the shielding range by the shielding means 131 formed in the illumination means 13 to allow the direct light to enter the object 2 by the illumination means 13 from the range in which the plane half angle θ of the irradiation solid angle is between θ1 degrees to θ2 degrees.

Figure 7A:
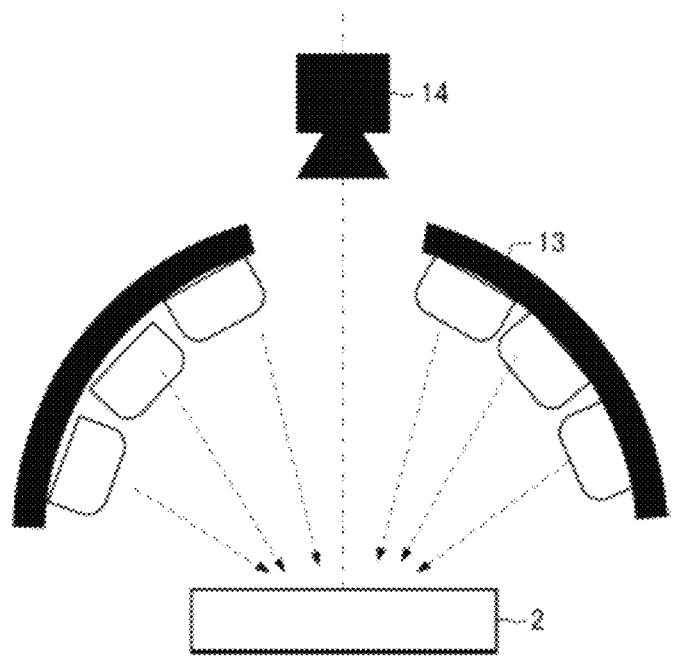
FIG. 7a illustrates an example of a relationship between a lighting range of an illumination means and an irradiation angle range.
Figure 7B:
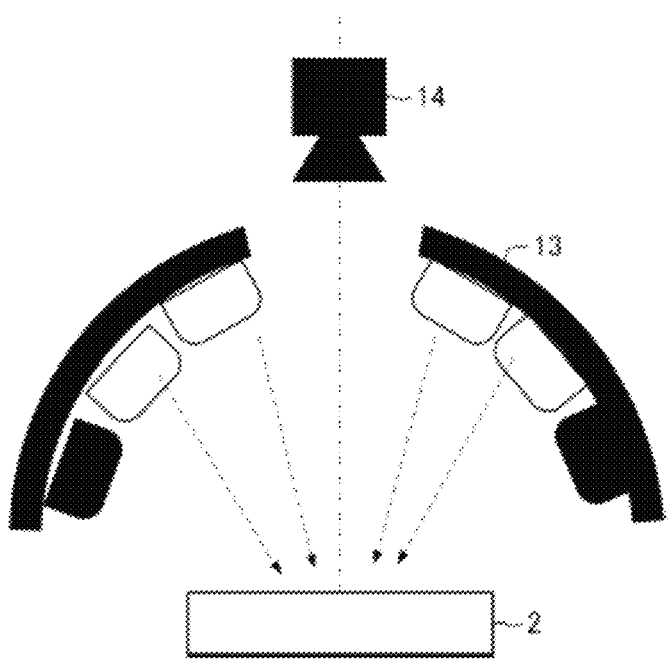
FIG. 7b illustrates an example of a relationship between a lighting range of an illumination means and an irradiation angle range.

FIG. 7a-b illustrates an example of controlling the lighting range of the illumination means 13. The illumination means 13 is a multistage ring-type lighting in which each stage is dimmable independently. FIG. 7a illustrates an example of a lighting range of the illumination means 13 and the irradiation angle range (θ1, θ2), and FIG. 7b illustrates an example of the irradiation angle range (θ1, θ2) when the lighting range of the illumination means 13 becomes narrower than that of the case illustrated in FIG. 7a. As described above, by controlling the lighting range of the illumination means 13, the values of the irradiation angle range (θ1, θ2) can be controlled.

Figure 8A:
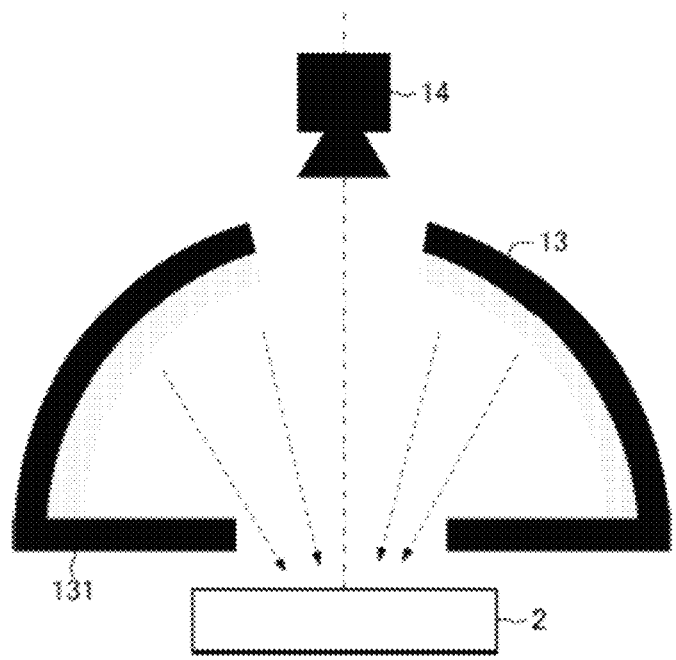
FIG. 8a illustrates an example of a shielding range and an irradiation angle range when a shielding means is provided to the illumination means.
Figure 8B:
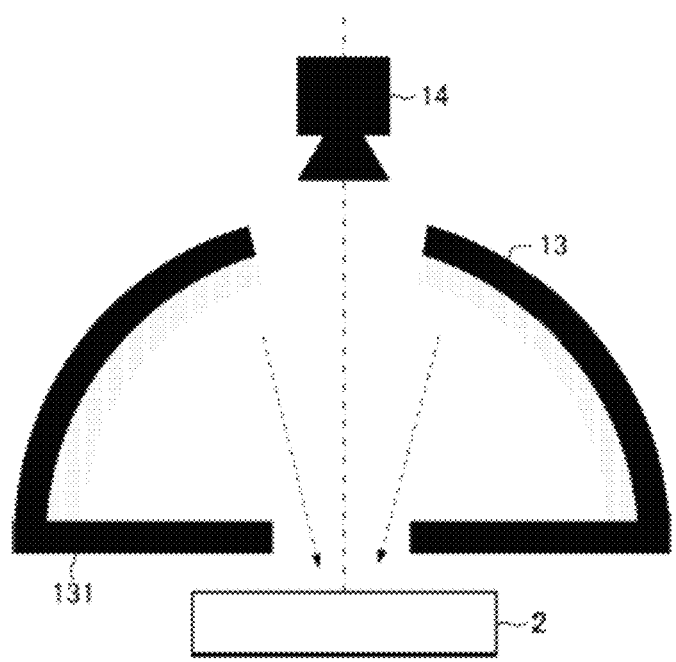
FIG. 8b illustrates an example of a shielding range and an irradiation angle range when a shielding means is provided to the illumination means.

FIG. 8a-b illustrates an example of controlling the shielding range of the shielding means 131 formed in the illumination means 13. In this example, the illumination means 13 is a dome-type lighting. The shielding means 131 is a diaphragm formed at the bottom of the lighting. FIG. 8a illustrates an example of the shielding range of the shielding means 131 and the irradiation angle range (θ1, θ2). FIG. 8b illustrates an example of a configuration in which a range larger than that of the configuration of FIG. 8a is shielded (for example, narrowing the diaphragm). By increasing the shielding range of the shielding means 131 (by shielding the object 2 more), the illumination means 13 can narrow the irradiation angle range (θ1, θ2). As described above, by the method of controlling the shielding means 131, the values of the irradiation angle range (θ1, θ2) can also be controlled.

The illumination control means 124 controls the irradiation angle range (θ1, θ2) by using any of the aforementioned means, a combination of the aforementioned means, a well-known means other than those described above, or a combination thereof. Note that the illumination control means 124 may control the irradiation angle range (θ1, θ2) by using a method other than those illustrated above.

The exemplary configuration of the control means 12 is as described above. Note that the configuration of the control means 12 is not limited to that described above.

For example, the function as the inclination statistic value calculation means 122 held by the control means 12 may be held by the measurement means 11. That is, the control means 12 may be configured to receive the inclination statistic value calculated by the measurement means 11. In that case, the control means 12 may not have the inclination statistic value calculation means 122.

Moreover, the function as the illumination control means 124 held by the control means 12 may be held by the illumination means 13. That is, the control means 12 may be configured to transmit the irradiation angle range determined by the irradiation angle range determination means 123 to the illumination means 13. In that case, the control means 12 may not have the illumination control means 124.

Note that the control means 12 may be configured to transmit the irradiation angle range determined by the irradiation angle range determination means 123 to a screen display unit such as a liquid crystal display (LCD) not illustrated or an external information processing device. In that case, control of the illumination means 13 may be performed manually by an operator or the like, for example.

As described above, the control means 12 may be configured to determine an irradiation angle range with respect to the object 2 by the illumination means 13 on the basis of the inclination statistic value received from the measurement means 11, and transmit the determined irradiation angle range to the illumination means 13.

Next, an exemplary operation of the image capturing system 1 will be described with reference to FIG. 9.

Figure 9:
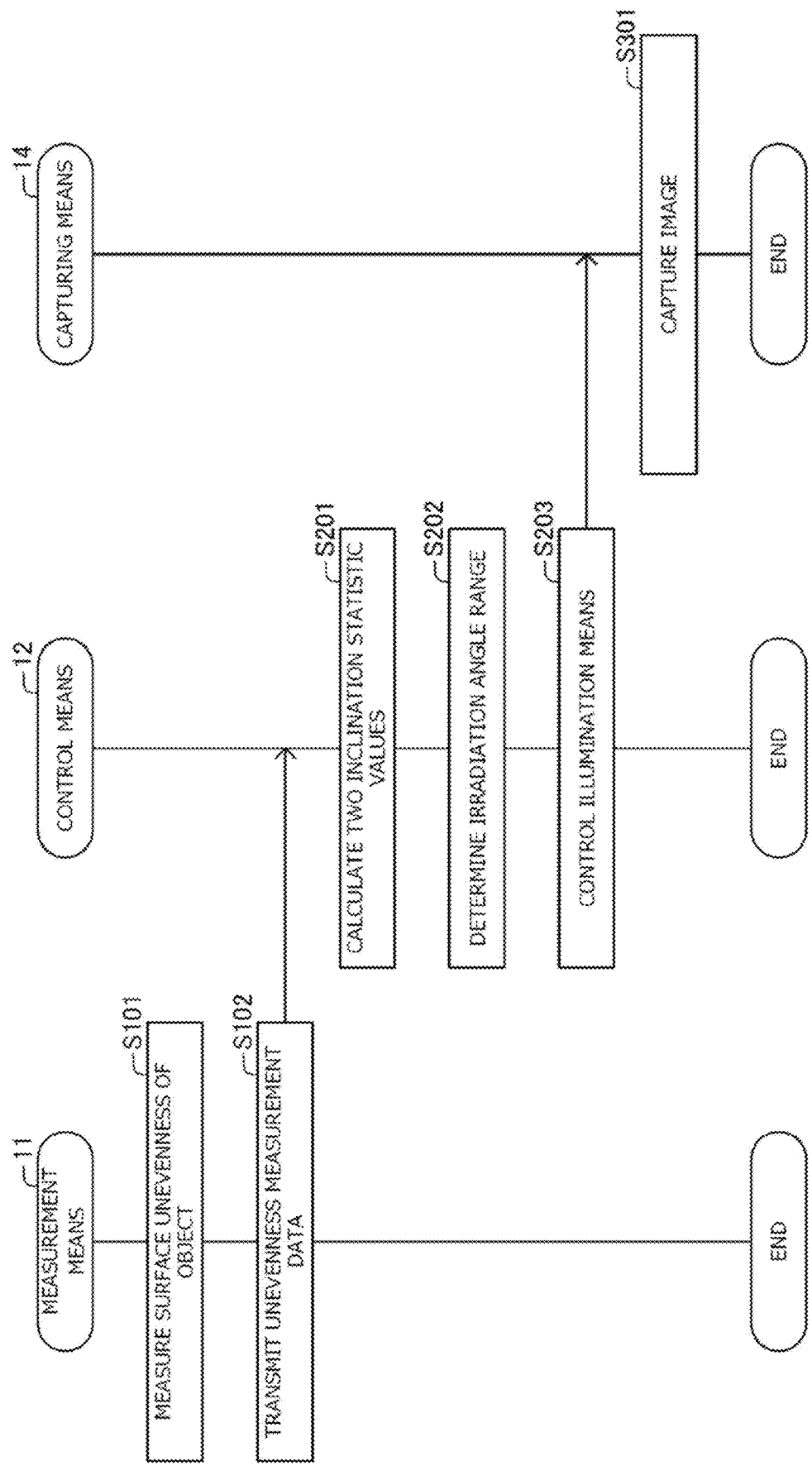
FIG. 9 is s sequence chart illustrating an exemplary operation of an image capturing system.

Referring to FIG. 9, the measurement means 11 measures unevenness on a surface of the object 2 and acquires unevenness measurement data (step S101). The measurement means 11 transmits the acquired unevenness measurement data to the control means 12 (step S102).

The inclination statistic value calculation means 122 of the control means 12 calculates the first inclination statistic value α1 and the second inclination statistic value α2 that are statistic values of inclination distribution, from the unevenness measurement data (step S201).

The irradiation angle range determination means 123 determines the irradiation angle range (θ1, θ2) on the basis of the inclination statistic values calculated by the inclination statistic value calculation means 122 (step S202). For example, the irradiation angle range determination means 123 calculates a value that is almost twice as large as the first inclination statistic value α1 as θ1, and a value that is almost twice as large as the second inclination statistic value α2 as θ2.

The illumination control means 124 controls the illumination means 13 on the basis of the irradiation angle determined by the irradiation angle range determination means 123 (step S203). For example, the illumination control means 124 controls the distance between the illumination means 13 and the object 2 and the shielding range by the shielding means 131 formed in the illumination means 13 to allow the direct light to enter the object 2 by the illumination means 13 from the range in which the zenith angle is between θ1 degrees to θ2 degrees.

Also, the illumination control means 124 can be configured to notify the capturing means 14 of the fact that illumination control has been completed. Notification to the capturing means 14 may be performed by the illumination means 13.

After completion of control by the illumination control means 124, at the timing of irradiating the object 2 by the illumination means 13, the capturing means 14 captures an image (step S301). Note that capturing of an image by the capturing means 14 may be performed manually.

The exemplary operation of the image capturing system 1 is as described above. As described above, the process of step S201 may be performed by the measurement means 11. Further, the process of step S203 may be performed by the illumination means 13.

As described above, the image capturing system 1 of the present embodiment includes the measurement means 11 and the control means 12. Further, the control means 12 includes the inclination statistic value calculation means 122 and the irradiation angle range determination means 123. With such a configuration, the inclination statistic value calculation means 122 can calculate the inclination statistic values on the basis of the measurement result by the measurement means 11. The irradiation angle range determination means 123 can determine the irradiation angle when the illumination means 13 irradiates the object 2, on the basis of the inclination statistic values calculated by the inclination statistic value calculation means 122. As described above, when the object 2 is captured by the capturing means 14 in a state where the illumination means 13 irradiates the object 2 from the irradiation angle range determined by the irradiation angle range determination means 123, a high-contrast image can be acquired. That is, with the configuration described above, it is possible to acquire a high-contrast image easily.

Figure 10A:
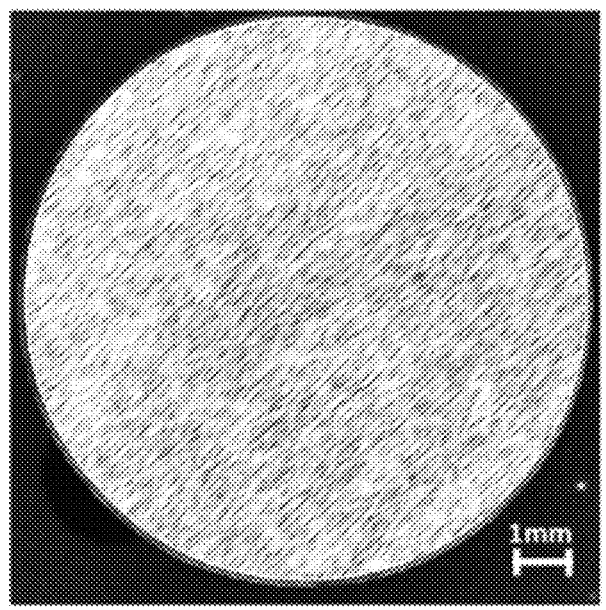
FIG. 10a illustrates an example when an actual object is captured by changing the irradiation angle range according to a first inclination statistic value.
Figure 10B:
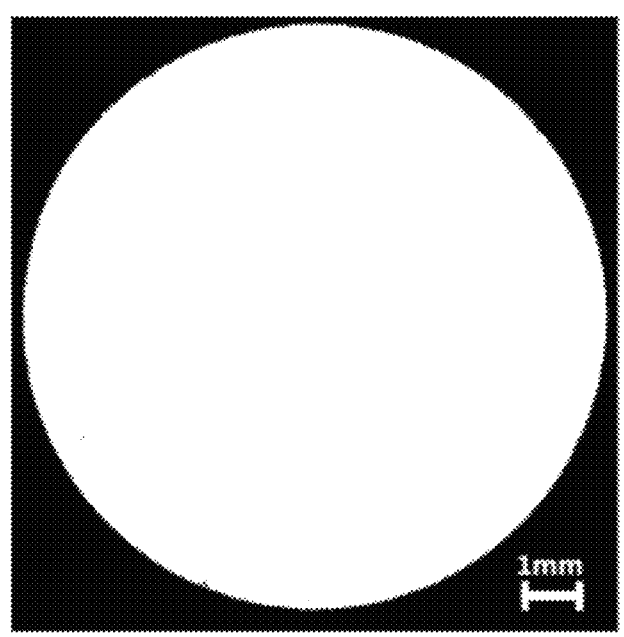
FIG. 10b illustrates an example when an actual object is captured by changing the irradiation angle range according to a first inclination statistic value.

FIG. 10a-b illustrates an example of a captured image of a surface of the actual object 2 performed by using the image capturing system 1, in order to show an effect of adjusting θ1 to make areas of light and dark almost half and half. FIG. 10a is an example of a captured image where θ1=2α, and FIG. 10b is an example of a captured image when θ1<2α1. Referring to FIG. 10a, in the captured image where θ1=2α1, it is found that the contrast is high and a clear light-dark pattern is obtained. On the other hand, referring to FIG. 10b, in the captured image where θ1<2α1, it is found that the contrast is lower compared with that of the captured image of FIG. 10a and a clear light-dark pattern is not achieved. As described above, it is found that by controlling the illumination means 13 to realize the plane half angle θ1=2α1, a high-contrast image can be acquired by the capturing means 14.

Figure 11A:
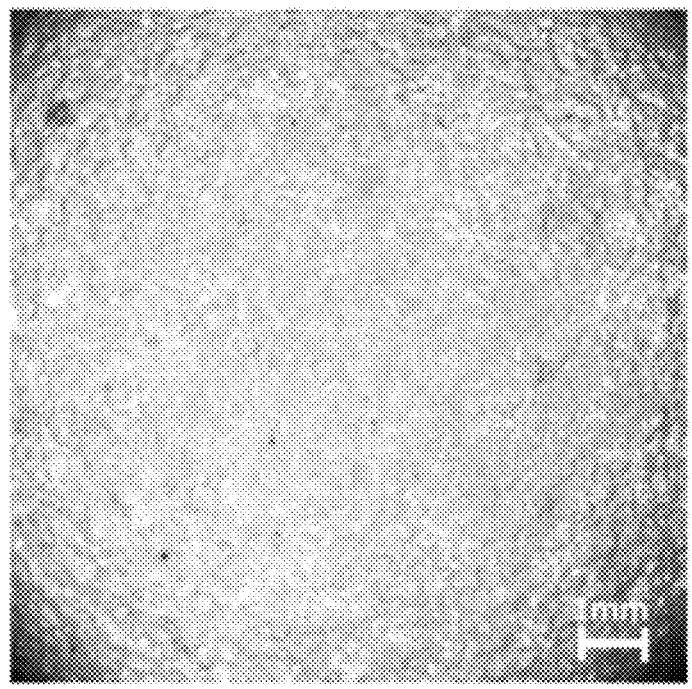
FIG. 11a illustrates an example when an actual object is captured by changing the irradiation angle range according to a second inclination statistic value.
Figure 11B:
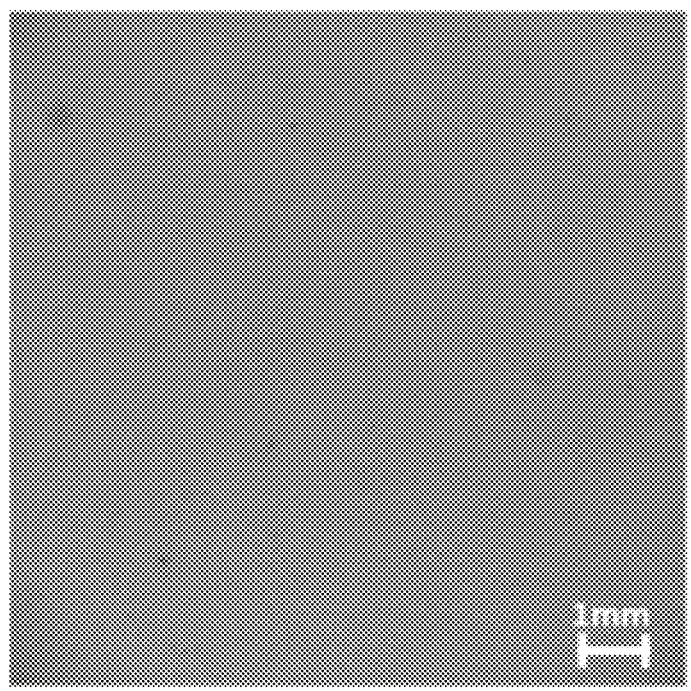
FIG. 11b illustrates an example when an actual object is captured by changing the irradiation angle range according to a second inclination statistic value.

Next, FIG. 11a-b illustrates an example of a captured image of a surface of the actual object 2 performed by using the image capturing system 1, in order to show an effect of reducing the diffuse reflection on the surface of the object 2. FIG. 11a is an example of a captured image where θ2=2α2, and FIG. 11b is an example of a captured image when θ2>2α2. Referring to FIG. 11a, in the captured image where θ2=2α2, it is found that the contrast is high, and a clear light-dark pattern is obtained. On the other hand, referring to FIG. 11b, in the captured image where θ2<2α2, it is found that the contrast is lower than that of the captured image of FIG. 11a, and a clear light-dark pattern is not obtained. As described above, it is found that by controlling the illumination means 13 to realize the plane half angle θ2=2α2, a high-contrast image can be acquired by the capturing means 14.

As described above, according to the present embodiment, the irradiation angle range can be determined by using measurement data of unevenness on a surface of the object. Accordingly, it is possible to select and adjust a lighting device before capturing an image of an object. Therefore, it is possible to reduce the cost before introduction.

While the present invention has been described with reference to the exemplary embodiment described above, the present invention is not limited to the above-described embodiment. The form and details of the present invention can be changed within the scope of the present invention in various manners that can be understood by those skilled in the art.

Second Exemplary Embodiment

Figure 12:
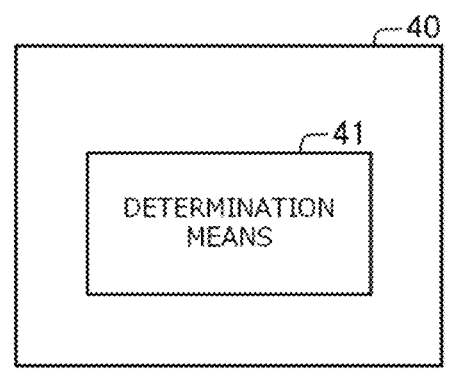
FIG. 12 is a block diagram illustrating an exemplary configuration of an information processing device according to a second exemplary embodiment of the present invention.

Next, a second exemplary embodiment of the present invention will be described with reference to FIG. 12. In the second exemplary embodiment, the outline of a configuration of an information processing device 40 will be described.

The information processing device 40 is a device to be used in an image capturing device that illuminates an object by an illumination means and captures reflected light from the object as a reflection image by a capturing means. FIG. 12 illustrates an exemplary configuration of the information processing device 40. Referring to FIG. 12, the information processing device 40 includes a determination means 41.

For example, the information processing device 40 implements the determination means 41 by execution of a program stored in a storage device by an arithmetic unit such as a CPU.

The determination means 71 determines the irradiation angle range for irradiating an object by the illumination means, on the basis of two types of inclination statistic values that are values corresponding to the inclination distribution of the unevenness existing on the surface of the object.

As described above, the information processing device 40 includes the determination means 71. With this configuration, the determination means 71 is able to determine an irradiation angle range for irradiating an object by the illumination means, on the basis of two types of inclination statistic values that are values corresponding to the inclination distribution of unevenness existing on a surface of the object. As a result, by determining the irradiation angle range on the basis of the two types of inclination statistic values, it is possible to acquire a high-contrast image easily.

Further, the information processing device 40 as described above can be realized by incorporation of a predetermined program in the information processing device 40. Specifically, a program that is another aspect of the present invention is a program for, in an information processing device to be used in an image capturing device that irradiates an object by an illumination means and captures reflected light from the object as a reflection image by a capturing means, realizing a determination means for determining an irradiation angle range for irradiating the object by the illumination means, on the basis of two types of inclination statistic values that are values corresponding to the inclination distribution of unevenness existing on a surface of the object.

Further, an information processing method to be executed by the information processing device 40 is an information processing method to be executed by an information processing device used in an image capturing device that irradiates an object by an illumination means and captures reflected light from the object as a reflection image by a capturing means. The method includes determining an irradiation angle range for irradiating an object by an illumination means on the basis of two types of inclination statistic values that are values corresponding to the inclination distribution of unevenness existing on a surface of an object.

An invention of a program (or a computer-readable storage medium storing a program) or an information processing method having the above-described configuration also exhibits the same actions and effects as those of the information processing device 40. Therefore, the above-described object of the present invention can also be achieved by such an invention. Moreover, by an information processing system including the information processing device 40, an illumination means, and a capturing means, the object of the present invention can also be achieved as in the case of the information processing device 40.

<Supplementary Notes>

The whole or part of the exemplary embodiments disclosed above can be described as the following supplementary notes. Hereinafter, the outlines of the information processing device and the like of the present invention will be described. However, the present invention is not limited to the configurations described below.

(Supplementary Note 1)

An information processing device to be used in an image capturing device, the image capturing device illuminating an object by illumination means and capturing reflected light from the object as a reflection image by capturing means, the information processing device comprising determination means for determining an irradiation angle range for irradiating the object by the illumination means, on a basis of two types of inclination statistic values that are values corresponding to inclination distribution of unevenness existing on a surface of the object.

(Supplementary Note 2)

The information processing device according to supplementary note 1, further comprising calculation means for calculating the two types of inclination statistic values that are the values corresponding to the inclination distribution of the unevenness existing on the surface of the object, on a basis of a measurement result of the unevenness existing on the surface of the object, wherein the determination means determines the irradiation angle range on a basis of the inclination statistic values calculated.

(Supplementary Note 3)

The information processing device according to supplementary note 2, wherein as the two types of inclination statistic values, the calculation means calculates a first inclination statistic value that substantially halves the inclination distribution, and a second inclination statistic value that represents a right bottom portion of the inclination distribution.

(Supplementary Note 4)

The information processing device according to supplementary note 3, wherein the determination means determines the irradiation angle range such that a plane radius of an irradiation solid angle falls within a range from a value that is twice as large as the first inclination statistic value to a value that is twice as large as the second inclination statistic value.

(Supplementary Note 5)

The information processing device according to any one of supplementary notes 1 to 4, further comprising control means for controlling the illumination means so as to realize the irradiation angle range determined by the determination means.

(Supplementary Note 6)

An information processing method comprising:

determining an irradiation angle range for irradiating an object by illumination means, on a basis of two types of inclination statistic values that are values corresponding to inclination distribution of unevenness existing on a surface of the object;

controlling the illumination means to illuminate the object within the irradiation angle range determined; and capturing reflected light from the object.

(Supplementary Note 7)

A computer-readable storage medium storing a program for causing an information processing device to realize, the information processing device being used in an image capturing device that illuminates an object by illumination means and capturing reflected light from the object as a reflection image by capturing means, determination means for determining an irradiation angle range for irradiating the object by the illumination means, on a basis of two types of inclination statistic values that are values corresponding to inclination distribution of unevenness existing on a surface of the object.

(Supplementary Note 8)

An information processing system comprising:

illumination means for illuminating an object;

capturing means for capturing reflected light from the object as a reflection image; and an information processing device including determination means for determining an irradiation angle range for irradiating the object by the illumination means, on a basis of two types of inclination statistic values that are values corresponding to inclination distribution of unevenness existing on a surface of the object.

(Supplementary Note 9)

The information processing system according to supplementary note 8, further comprising measurement means for measuring the unevenness existing on the surface of the object, wherein the determination means determines the irradiation angle range for irradiating the object by the illumination means, on the basis of the two types of inclination statistic values that are the values corresponding to the inclination distribution of the unevenness measured by the measurement means.

(Supplementary Note 10)

The information processing system according to supplementary note 9, wherein the information processing device includes calculation means for calculating the two types of inclination statistic values that are the values corresponding to the inclination distribution of the unevenness existing on the surface of the object, on a basis of the measurement result of the unevenness existing on the surface of the object, and the determination means determines the irradiation angle range on a basis of the inclination statistic values calculated.

It should be noted that the program described in the exemplary embodiments and the supplementary notes may be stored in a storage device or stored on a storage medium readable by a computer. The storage medium is a portable medium such as a flexible disk, an optical disk, a magneto-optical disk, or a semiconductor memory, for example.

REFERENCE SIGNS LIST 1 image capturing system
10 object identifying device
11 measurement means
12 control means
121 transmission/reception means
122 inclination statistic value calculation means
123 irradiation angle range determination means
124 illumination control means
13 illumination means
131 shielding means 14 capturing means
15 collation means
2 object
31 one-dimensional image
32 cross-section

What is claimed is:

1. An information processing device used in an image capturing device illuminating an object and capturing reflected light from the object as a reflection image, the information processing device comprising:
a memory storing instructions; and
at least one processor configured to execute the instructions to perform:
on a basis of a measurement result of unevenness of a surface of the object, generating an inclination distribution representing a relationship between inclination angles at a plurality of points on the surface of the object and respective frequencies of the inclination angles, and calculating two types of inclination statistic values including a first inclination statistic value and a second inclination statistic value, the first inclination statistic value being an angle that halves an area of the inclination distribution, the second inclination statistic value being an angle extracted from a right bottom portion of the inclination distribution; and
determining an irradiation angle range for irradiating the object, on a basis of the calculated two types of inclination statistic values.

2. The information processing device according to claim 1, wherein
the irradiation angle range is determined such that the irradiation angle range is from a value that is twice as large as the first inclination statistic value to a value that is twice as large as the second inclination statistic value.

3. The information processing device according to claim 1, wherein the at least one processor is configured to execution the instructions to further perform:
controlling the illumination of the object so as to realize the irradiation angle range determined.

4. An information processing method comprising:
on a basis of a measurement result of unevenness of a surface of an object, generating, by a processor, an inclination distribution representing a relationship between inclination angles at a plurality of points on the surface of the object and respective frequencies of the inclination angles, and calculating two types of inclination statistic values including a first inclination statistic value and a second inclination statistic value, the first inclination statistic value being an angle that halves an area of the inclination distribution, the second inclination statistic value being an angle extracted from a right bottom portion of the inclination distribution; and
determining, by the processor, an irradiation angle range for irradiating the object, on a basis of two types of inclination statistic values that are values corresponding to inclination distribution of unevenness existing on a surface of the object;
controlling, by the processor, illumination of the object within the irradiation angle range determined; and
capturing reflected light from the object.

5. An information processing system comprising:
a light source that illuminates an object;
a camera that captures reflected light from the object as a reflection image; and
an information processing device comprising:
a memory storing instructions; and
at least one processor configured to execute the instructions to perform:
on a basis of a measurement result of unevenness of a surface of the object, generating an inclination distribution representing a relationship between inclination angles at a plurality of points on the surface of the object and respective frequencies of the inclination angles, and calculating two types of inclination statistic values including a first inclination statistic value and a second inclination statistic value, the first inclination statistic value being an angle that halves an area of the inclination distribution, the second inclination statistic value being an angle extracted from a right bottom portion of the inclination distribution; and
determining an irradiation angle range for irradiating the object by the light source, on a basis of the calculated two types of inclination statistic values.

6. The information processing system according to claim 5, further comprising
a measurement device that measures the unevenness on the surface of the object.

* * * * *